Aug. 7, 1951     P. L. SCHNEIDER     2,563,283
AIRPLANE ENGINE CONTROLLER
Original Filed April 24, 1943     2 Sheets—Sheet 2

Patented Aug. 7, 1951

2,563,283

UNITED STATES PATENT OFFICE 2,563,283

AIRPLANE ENGINE CONTROLLER

Paul L. Schneider, Anderson, Ind., assignor to General Motors Corporation, Detroit, Mich., a corporation of Delaware Continuation of application Serial No. 484,419, April 24, 1943. This application March 13, 1944, Serial No. 526,251

14 Claims. (Cl. 60—13)

This invention relates to the control of an airplane power plant comprising an internal combustion engine, a supercharger and an engine exhaust driven turbine which drives the supercharger. The control system of the present invention operates in conjunction with a throttle valve regulator responsive to a selected fuel intake pressure which effects opening movements of the valve in order that a selected pressure will be maintained in the fuel intake as altitude increases.

This application is a continuation of application Serial No. 484,419, filed April 24, 1943, now abandoned.

It is an object of the present invention to provide a system of control having speed responsive means for determining the low economical limit and the high safe limit of turbine speed, the low speed operation of the turbine being such as to maintain a supercharger pressure sufficient for engine requirements during flight in a lower altitude range, and having means responsive to movement of the throttle valve by the regulator to substantially wide open position for causing the speed of the turbine to increase above the minimum speed to whatever value is required to maintain the selected pressure in a range of altitudes above that which was critical for operation of the turbine at minimum speed, the speed increase of the turbine ceasing when maximum speed is reached. The means above referred to is the electrical mechanism which is controlled by movement of the throttle, an arm being moved as the throttle is moved to effect actuation of certain switches to control the operation of such electrical mechanism in the manner set forth hereinafter. When the pressure selection is abruptly increased and the throttle valve moves suddenly to wide open position, the system of control provides for a momentary rapid acceleration of the turbine preliminary to setting back to the speed required to maintain the selected intake pressure. The object is to provide for rapidly accelerating the air during its course through an air cooler and other air ducts connected with the exhaust turbine at the rear of the airplane and with the engine carburetor at the front.

While the fuel intake pressure is being maintained it is to be noted that engine exhaust back pressure is increasing as the waste gate is being closed to cause the turbine speed to increase. This system also provides for limiting the extent to which the waste gate is closed so that exhaust back pressure will not exceed an amount which is allowed for turbine operation without seriously reducing engine power output to the propeller. Therefore the ultimate critical altitude for a given selected pressure is that which obtains when the throttle has been opened as wide as possible by the regulator and the position of the waste gate is either such that the speed of the turbine is at the maximum or is such that the exhaust back pressure does not exceed a certain amount.

In the disclosed embodiment of the present invention the functions of the system are directed to the control of an electric servo-motor which controls the position of the exhaust waste gate.

Further objects and advantages of the present invention will be apparent from the following description, reference being had to the accompanying drawings wherein a preferred embodiment of the present invention is clearly shown.

Figure 1:
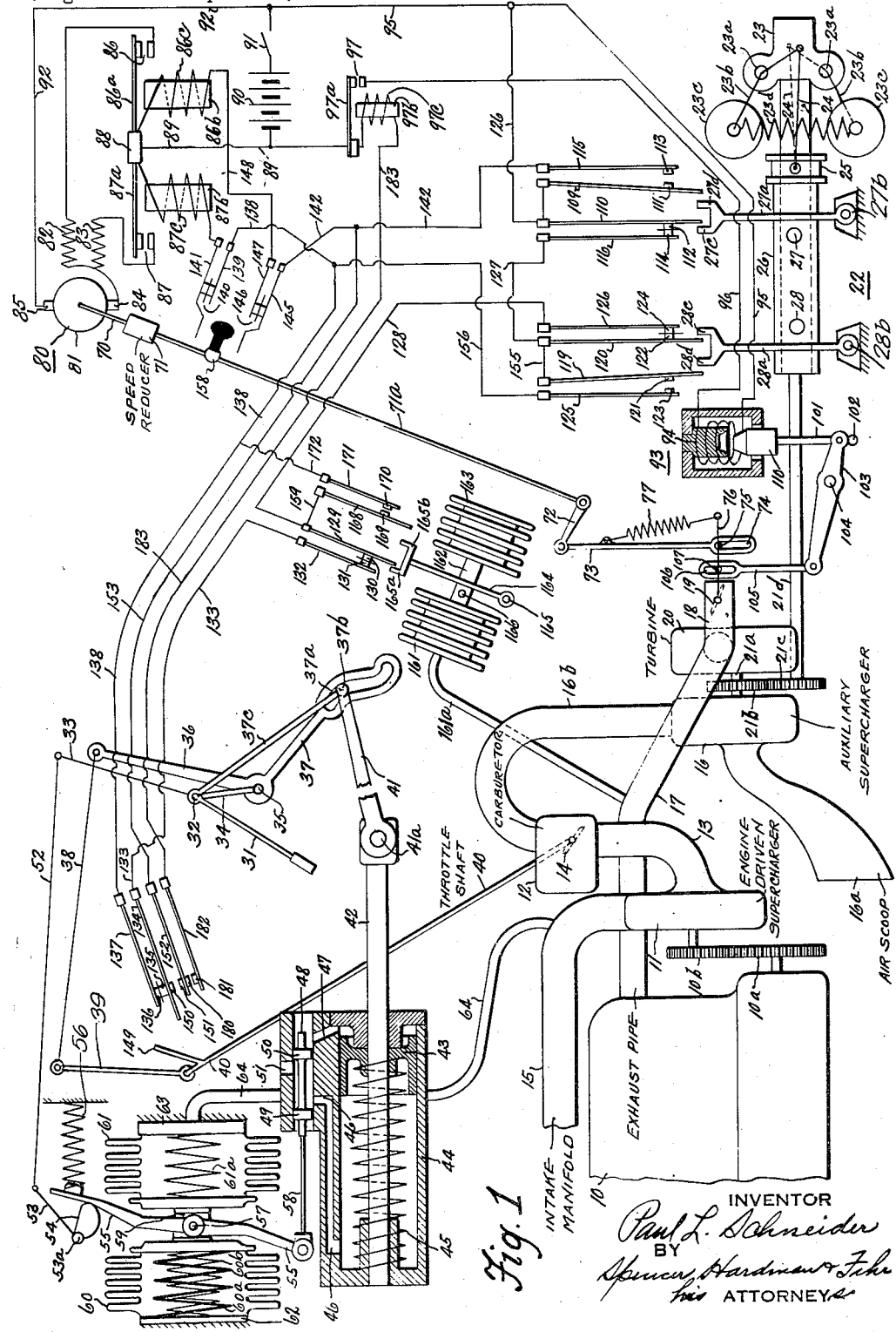
Fig. 1 is a diagram of a system of control embodying the present invention.

Referring to Fig. 1, engine 10 drives, through gears 10a and 10b, a supercharger 11 connected by duct 13 with a carburetor 12 and with an intake manifold 15. The flow of charging air or fuel mixture is controlled by a throttle valve 14. Carburetor 12 is connected by a duct 16b with an auxiliary supercharger 16 which receives air entering an air scoop 16a.

The exhaust pipe 17, having an outlet branch 18 controlled by waste-gate valve 19, leads to an exhaust gas turbine 20 which drives the supercharger 16 having a shaft 21a connected by gears 21b and 21c with a shaft 21d which operates a switch controlling governor 22 comprising a member 23 carrying pivots 23a supporting levers 23b carrying fly balls 23c, outward movement of which is restrained by spring 23d. Levers 23b are connected by links 24 with a collar 25 received by a groove in a non-rotatable sleeve supported by the shaft 21d. Sleeve 26 carries pins 27 and 28 engageable respectively with levers 27a and 28a pivoted respectively at 27b and 28b. These levers have forked end portions which adapt them for operation upon resilient metal switch blades to be described.

Throttle valve 14 is under the control of a throttle valve regulating device which determines the extent of opening of the valve 14 in order to maintain a selected pressure.

The regulating device has a main control lever 31 which is manually operated from the pilot's throttle lever. Lever 31 is secured to a rod or shaft 32 which is supported for rotation in any suitable supporting bracket and movement of the lever 31 operates arms 33 and 34 which are also secured to the rod or shaft 32. Arm 36 is connected by link 38 with arm 39 attached to shaft 40 attached to throttle valve 14. Arm 37 has a cam slot 37a which receives a cam follower roller 37b carried by a link 41 connected by a pin 41a with the piston rod 42 of an hydraulic servomotor having a piston 43 slidable in a cylinder 44 and urged toward the right by a spring 45. Roller 37b is connected also with an arm 37c loosely journalled on shaft 32. Cylinder 44 has ports 46 and 47 controlled by a valve 48 having lands 49 and 50 capable of covering both ports 46 and 47 simultaneously, or of placing pressure fluid inlet 51 in communication with either of these ports.

Arm 33 is connected by link 52 with an arm 53 connected with shaft 53a for rotating a pressure selecting cam 54 against which a lever 55 is urged by a compression spring 56. Lever 55 is fulcrumed at 57 and is connected by rod 58 with valve 48. Fulcrum 57 is supported by bridge 59 connecting the free ends of metal bellows 60 and 61 having their ends 62 and 63 respectively, fixed. Bellows 60 is sealed and evacuated. Bellows 61 is connected by pipe 64 with the intake manifold 15. The bellows 60 contains springs 60a and 60b and bellows 61 contains a spring 61a, said springs being so calibrated that fulcrum 57 moves in a predetermined relation to changes in engine intake manifold pressure.

The normal or inoperative position of the piston rod 42 is shown. Movement of lever 31 counterclockwise from the normal position shown causes fulcrum 35 to move counterclockwise and the bell crank lever 36, 37 to move clockwise since its arm 37 is caused to pivot on roller 37b within the cam slot 37a of arm 37. Link 38 moves right and lever 39 and shaft 40 turn clockwise to open the throttle 14. At the same time lever 33 turns counterclockwise, link 52 moves left and lever 53, shaft 53a and cam 54 turn counterclockwise, thereby causing lever 55 to locate valve 48 so that pressure fluid inlet 51 communicates with cylinder port 47. Then rod 42 moves left to effect whatever further opening movement of throttle valve 14 is required to maintain in the intake passage 15 the pressure selected by cam 54 when moved from its normal position by movement of lever 31 counterclockwise. When the selected pressure is attained, bellows 61 will have expanded to an extent such that fulcrum 57 moves to cause valve 48 to be placed in position for closing both ports 46 and 47 of cylinder 44. As the altitude increases, rod 42 will move further and further toward the left to cause the selected pressure to be maintained.

The lengths and locations of the levers and the shape of the cam slot 37a of the regulator are such that the throttle valve 14 can be moved by the piston 43 to wide open position for pressure selections over a relatively wide range, as from below normal cruise to emergency. This feature is disclosed more in detail in the copending application of Jorgensen and Taylor, Serial No. 612,392, filed August 24, 1945.

When the throttle 14 has been fully opened to maintain a selected pressure at a certain altitude, that altitude is critical for that pressure selection with low speed turbine and supercharger operation. The only way by which a higher altitude can be attained without substantial loss of power is to increase the pressure in the fuel intake passage 15 by increasing the governed speed of the auxiliary supercharger. That increase is obtained by closing the exhaust turbine waste gate 19 by means responsive to movement of the valve 14 by the pressure regulating device to substantially wide open position.

The waste gate 19 is controlled by a reversible electric motor 80 which drives a shaft 70 connected by a speed reducer 71 and a shaft 71a with a lever 72 connected with a link 73 having a slot 74 receiving a stud 75 carried by a lever 76 connected with the waste gate 19. A spring 77 connects the lever 76 with the link 73 and urges the lever 76 upwardly, the stud 75 engaging the link 73 at the upper end of the slot 74. This mechanism provides for actuation of the waste gate 19 by an accelerating device, to be described, independently of the motor 80.

Motor 80 has an armature connected through a commutator 81 with brushes 84 and 85. Brush 84 is connected with oppositely wound fields 82 and 83 which are separately energized to produce rotation of the armature in opposite directions. Field 82 is connected by relay contacts 86, when closed, with relay armature 86a, terminal 88 and wire 89 with a battery 90, connected by a switch 91 and a wire 92 with brush 85. Field 83 is connected with battery 90 by contacts 87, when closed, and by armature 87a, terminal 88 and wire 89. The closing of contacts 86 is effected by the attraction of armature 86a toward a core 86b when a coil 86c is energized; and the closing of contacts 87 is effected by the attraction of armature 87a toward a core 87b when a coil 87c is energized.

The control for minimum speed will now be explained. A minimum governed turbine speed of 10,000 R. P. M., for example, is selected as an economical speed for turbine operation when the plane is in a lower altitude range. At that speed the auxiliary supercharger 16 will operate fast enough to overcome friction of the air moving through pipe 16b, carburetor 12, and pipe 13, so that there is no drag on the supercharger 11. Supercharger 11 will provide the intake pressure required by the engine as the altitude increases from ground level to a medium critical altitude which might range from 6000 ft. for a high pressure selection to 12,000 ft. for a low pressure selection. Until the critical altitude for low speed operation of the turbine has been reached, the throttle 14 is not fully opened and switch contacts 135, 136 adjacent the regulator 30 are closed. When the speed attains 10,000 R. P. M., sleeve 26 has moved sufficiently to the left to cause pin 27 to release the lever 27a to allow a blade 110 (which has been confined by prong 27c) to return resiliently to normal position as shown, thereby causing its contact 112 to engage a contact 114 in a blade 116. When contacts 135, 136 and 112, 114 are closed, relay coil 87c is connected with battery 90 through the following circuit: battery 90, switch 91, wire 95, wire 126, blade 110, contacts 112, 114, blade 116, wire 127, blade 120, contacts 122, 124, blade 126, wire 128, blade 129, contacts 130, 131, blade 132, wire 133, blade 134, contacts 135, 136, blade 137, wire 138, limit-switch blade 139, contacts 140, limit-switch blade 141, coil 87c, terminal 88 and wire 89. Contacts 87 close and field 83 is energized to cause armature 81 to rotate and to turn lever 72 clockwise and lever 76 counterclockwise to open the gate 19 and to reduce the turbine speed. When the speed falls slightly below 10,000 R. P. M. contacts 112, 114 open. Coil 87c is deenergized and opening of gate 19 stops. Contacts 111, 113 close at about 9900 R. P. M., and coil 86c is energized through the following circuit: battery 90, switch 91, wire 95, wire 126, blade 109, contacts 111, 113, blade 115, wire 142, limit-switch blade 145, contacts 146, limit-switch blade 147, wire 148, coil 86c, terminal 88 and wire 89. Field 82 is energized and the motor 80 turns the lever counterclockwise and the gate 19 moves clockwise toward closed position, and the speed starts to increase. Thus the minimum governed speed is maintained at slightly below 10,000

Figure 2:
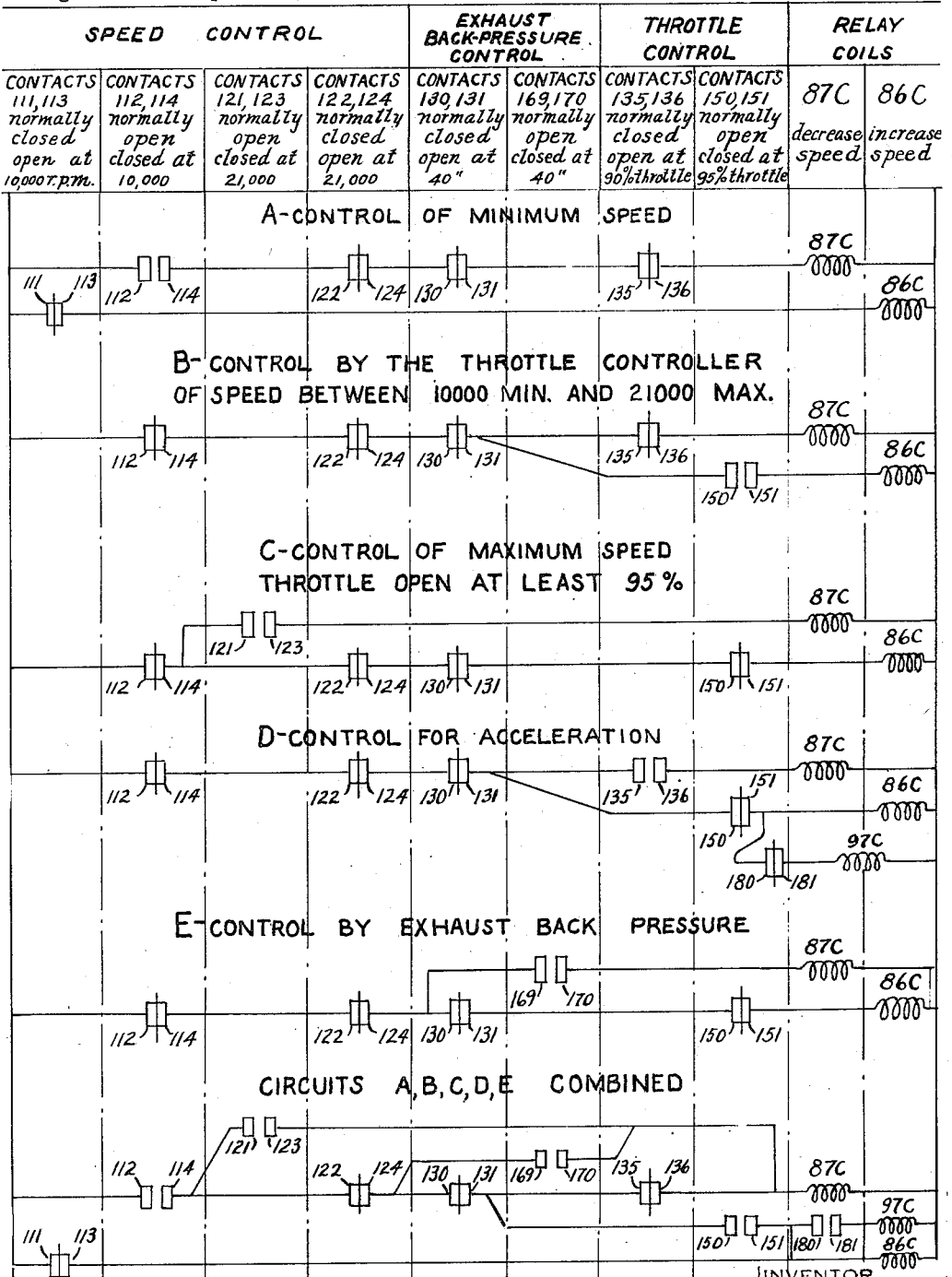
Fig. 2 is a chart of operations of the control system.

R. P. M., by an alternate closing of contacts 112, 114, and contacts 111, 113. These control circuits are shown in simplified form in Fig. 2 under "A. Control of Minimum Speed."

As the altitude increases, the pressure regulating device increases the opening of throttle 14 in order to maintain a selected pressure determined by the position of cam 54. At about 90% of full throttle movement, a lever 149 attached to throttle operating shaft 40 engages blade 134 and separates contacts 135, 136. This removes speed reducing control by relay coil 87c. At about 95% of full throttle opening, lever 149 will move blade 134 further downwardly to cause contact 150 of blade 134 to engage a contact 151 of blade 152. This causes energization of relay coil 86c through the following circuit: battery 90, switch 91, wire 95, wire 126, contacts 112, 114, wire 127, contacts 122, 124, wire 128, contacts 130, 131, wire 133, contacts 150, 151, wire 153, wire 142, limit-switch contacts 146, wire 148, coil 86c, terminal 88 and wire 89. Turbine speed increases to cause the supercharger 16 to increase the available pressure. As the pressure rises, the pressure regulating device moves the valve 14 toward closed position to reduce the pressure at the engine intake valves. Contacts 151, 150 open as lever 149 rotates counterclockwise with a closing movement of valve 14 to 95% open position; and contacts 135, 136 close when the valve 14 is 90% open, thus placing coil 87c in circuit with the battery 90 to cause the motor 80 to open waste gate 19 and reduce the turbo speed. Then, as altitude increases, the pressure regulating device opens the valve 14 and contacts 135, 136 open, and contacts 150, 151 close, and turbine speed starts increasing. A simplified showing of the control circuits described in this paragraph is made in Fig. 2 under "B. Control by the Throttle Controller." Thus the pressure regulating device takes over control of turbine speed when that altitude is reached which is critical for the selected intake pressure with low speed operation of the auxiliary supercharger 16. As altitude increases, the pressure regulating device causes the governed speed of the turbine to be increased so that when the throttle 14 is 95% open, the selected pressure will be maintained. Therefore the ultimate critical altitude for a selected pressure is that which exists when the throttle is 100% wide open and the pressure regulating device has raised the governed turbine speed to the maximum.

At maximum speed, the governing is taken over by the speed responsive device 22. At about 20,950 R. P. M. for example, pin 28 moves lever 28a left and its prong 28c engages blade 120 to separate contacts 122, 124. At 21,050 R. P. M. prong 28d engages blade 119 to bring contacts 121, 123 into engagement. Relay coil 87c is connected with the battery through the following circuit: battery 90, switch 91, wire 95, wire 126, contacts 112, 114, wire 127, wire 155, contacts 121, 123, wire 156, wire 138, contacts 140, coil 87c, terminal 88, wire 89. Then the motor 80 starts opening gate 19, the speed drops, sleeve 26 moves right, and contacts 121, 123 open, at slightly under 21,050 R. P. M. Contacts 122, 124 close at 20,950 R. P. M., coil 86c is energized, motor 80 closes gate 19 and the speed increases. Therefore as long as the throttle valve 14 is 95% open, the maximum governed speed of the turbine is maintained at about 21,000 R. P. M. When the plane descends from the altitude which is critical for a selected pressure with maximum turbine speed, the speed of the turbine is caused to decrease to whatever speed is necessary to maintain a selected pressure with 95% throttle opening. The control circuits described in this paragraph are shown in simplified form in Fig. 2 under "C. Control of Maximum Speed."

The system provided for a momentary rapid acceleration of the turbine when the pressure selection is abruptly and considerably increased and the pressure regulating device quickly moves the throttle to fully wide open position. By making 95% throttle opening sufficient to cause closing of contacts 150, 151, an additional 5% movement of the throttle to wide open position and corresponding movement of lever 149 is provided to effect also the closing of contacts 180, 181 which results in connecting relay coil 97c with the battery through the following circuit: battery 90, switch 91, wire 95, wire 126, contacts 112, 114, wire 127, contacts 122, 124 (closed slightly below maximum speed), wire 128, contacts 130, 131, wire 133, contacts 150, 151, contacts 180, 181, wire 183, coil 97c. A simplified showing of this circuit is made in Fig. 2 under "D. Control for Acceleration." Relay contacts 97 close to connect solenoid coil 94 with the battery. Armature 110 moves up, link 105 moves down, pin 107 is engaged by link 105 at the upper end of slot 106, lever 76 moves down and gate 19 closes. Immediately there is rapid acceleration of the turbine to maximum to increase the speed of air movement from the supercharger 16 to the carburetor which may be a considerable distance apart. The attained turbine speed may exceed the speed required to maintain the pressure selected with 95% throttle opening, hence the pressure regulating device will start closing the throttle and contacts 180—181 will open; but, meanwhile, the motor 80 will be operating to place the link 73 in a position such that, when solenoid 73 is deenergized by opening the contacts 180, 181, the gate 19 will be located at least approximately the correct position for effecting a turbine speed that will give the selected pressure when the throttle is 95% open. If the new waste gate position is correct to maintain the proper turbine speed for the pressure selected, the throttle will close a little more, and contacts 150, 151 will open, thus stopping operation of the motor 80 to close the waste gate. If the new waste gate position is such that turbine speed is too high, the throttle 14 will continue to close and contacts 135, 136 will close to cause reversal of motor 80 and opening of gate 19, thus reducing turbine speed. If the new waste gate position does not produce a turbine speed high enough to maintain the selected intake pressure after the acceleration period, the throttle again begins to open further. This causes contacts 150, 151 to close or both contacts 150, 151 and contacts 180, 181 to close, depending on how much below the required speed, the turbine speed was at the end of the acceleration period. If only contacts 150, 151 close, the gate 19 is closed relatively slowly and the turbine speed is raised relatively slowly; and if contacts 150, 151 and contacts 180, 181 close, the gate 19 is quickly, fully closed and the turbine has a short acceleration period during which the motor 80 operates to fix a new final position of greater closing of the gate 19.

The operation of shaft 71a is confined to a travel sufficient only to fully close or fully open the gate 19. For this purpose there is a lever 158 connected with shaft 71a which engages limit-switch blades 141 and 145 to open the limit switches at times when rotation of shaft 71 in either direction should cease in all events.

The raising of turbine speed by means controlled by the regulator in the range between minimum and maximum will take place provided a predetermined exhaust back pressure is not exceeded. Below exhaust pressure of 40" Hg. absolute, for example, contacts 130, 131 remain closed, when that pressure is reached contacts 130, 131 open and closing of the waste gate ceases; and if exceeded, contacts 169 and 170 of blades 168 and 171 respectively are closed and relay coil 87c is connected with the battery through the following circuit: battery 90, switch 91, wire 95, wire 126, contacts 112, 114, wire 127, contacts 122, 124, wires 128 and 159, contacts 169, 170, wire 172, wire 138, contacts 140, coil 87c, terminal 88, wire 89. Motor 80 opens gate 19, and the turbine speed and exhaust back pressure are reduced. Contacts 130, 131 and contacts 169, 170 are controlled by a bellows 161 connected by pipe 161a with engine exhaust pipe 17 and tied by a bar 162 to an altitude compensating aneroid 163. When the exhaust back pressure is below 40" Hg., contacts 130, 131 are closed and the maximum governed speed may be maintained in the manner described. When the pressure reaches 40" Hg., pin 166 on bar 162 engages lever 164, pivoted at 165, and its tine 165a engages blade 129 and contacts 130, 131 are opened. Slightly above 40" Hg., tine 165b engages blade 168 and closes contacts 169, 170. The waste gate 19 is opened and the turbine speed and the back pressure decrease. When the exhaust back pressure falls slightly below the maximum, the pin 166 moves left and contacts 169, 170 open and contacts 130, 131 close again, this cycle being repeated so long as the back pressure tends to exceed the maximum. If the maximum is not exceeded, control of the waste gate 19 is returned to the regulator 30. In this way, the waste is opened no longer than necessary to avoid excessive back pressure. The control circuits described in this paragraph are shown in simplified form in Fig. 2 under "E. Control by Exhaust Back Pressure."

It is apparent from the foregoing that the present system of control provides speed responsive means for fixing the minimum and maximum speeds of the turbine. As an ascent is made, the regulator sets the throttle valve at a position which will allow the engine to receive out of the total available supercharger pressure (with minimum speed operation of the supercharger 16) that which has been pre-selected for the operation of the engine. As altitude increases the throttle valve opening increases. When the throttle is 95% open, the pressure regulating device takes over the control of the turbine speed to increase it from minimum to maximum to enable the airplane to climb to an altitude in excess of that which would be critical for minimum speed operation of the supercharger 16. At maximum rated speed of the turbine, the speed responsive means takes over the control to maintain the maximum speed. However, if, before maximum speed of the turbine is reached, the exhaust back pressure exceeds the maximum allowable value, then means responsive to exhaust back pressure takes over the control of the turbine speed by limiting the closing of waste gate to that for which the exhaust back pressure will not exceed the maximum.

During a descent, maximum speed control or maximum exhaust back pressure control will yield to control by the pressure regulating device until the regulator does not maintain the throttle valve 14 wide open. Then control of the regulating device yields to minimum speed control.

While the embodiment of the present invention as herein disclosed, constitutes a preferred form, it is to be understood that other forms might be adopted, all coming within the scope of the claims which follow.

What is claimed is as follows:

1. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, speed responsive means normally operative for controlling the servo-motor to obtain a governed minimum turbine speed, speed responsive means for controlling the servo-motor to obtain a governed maximum turbine speed, a throttle valve regulator responsive to intake pressure for effecting a movement of the throttle valve sufficient to maintain a selected pressure with changing altitude, manually operable means for partially opening the throttle valve and for selecting an intake pressure to be maintained by the regulator, means brought under the control of the regulator when the throttle valve has been moved substantially wide open for causing the servo-motor to move the waste-gate toward closed position to effect whatever increase in turbine speed is required to maintain the selected pressure with wide open throttle until maximum speed is reached, and means for limiting the operation of the servo-motor to close the waste-gate when the exhaust back pressure exceeds a certain amount.

2. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, a regulator responsive to intake pressure for positioning the throttle valve in order to maintain a selected intake pressure with changing altitude, manually operable means for selecting the pressure to be maintained by the regulator, speed responsive means normally effective to control the servo-motor for positioning the waste gate for minimum governed speed of the supercharger, means rendered effective upon movement of the throttle valve by the regulator to wide open position for overriding the minimum speed control means and for causing the servo-motor to close the waste gate as altitude increases in order to increase turbine speed and supercharger pressure, speed responsive means which overrides control of the servo-motor by the regulator when a certain maximum turbine speed is attained and which so controls the servo-motor as to position the waste gate for maximum turbine speed, and exhaust back pressure responsive means which overrides control of the servo-motor by the regulator when a maximum allowable exhaust back pressure is reached and causes the servo-motor to limit the closing of the waste gate.

3. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, speed responsive means normally operative for controlling the servo-motor to obtain a governed minimum turbine speed, speed responsive means for controlling the servo-motor to obtain a governed maximum turbine speed, a throttle valve regulator responsive to intake pressure for effecting a movement of the throttle valve sufficient to maintain a selected pressure with changing altitude, manually operable means for partially opening the throttle valve and for selecting an intake pressure to be maintained by the regulator, and means brought under the control of the regulator when the throttle valve has been moved substantially wide open for causing the servo-motor to move the waste-gate toward closed position to effect whatever increase in turbine speed is required to maintain the selected pressure with wide open throttle until maximum speed is reached.

4. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, a regulator responsive to intake pressure for positioning the throttle valve in order to maintain a selected intake pressure with changing altitude, manually operable means for selecting the pressure to be maintained by the regulator, speed responsive means normally effective to control the servo-motor for positioning the waste-gate for minimum governed speed of the supercharger, means rendered effective upon movement of the throttle valve by the regulator to wide open position for overriding the minimum speed control means and for causing the servo-motor to close the waste-gate as altitude increases in order to increase turbine speed and supercharger pressure, and speed responsive means which overrides control of the servo-motor by the regulator when a certain maximum turbine speed is attained and which so controls the servo-motor as to position the waste-gate for maximum turbine speed.

5. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, speed responsive means normally operative for controlling the servo-motor to obtain a governed minimum turbine speed, speed responsive means for controlling the servo-motor to obtain a governed maximum turbine speed, a throttle valve regulator responsive to intake pressure for effecting a movement of the throttle valve sufficient to maintain a selected pressure with changing altitude, manually operable means for partially opening the throttle valve and for selecting an intake pressure to be maintained by the regulator, means brought under the control of the regulator when the throttle valve has been moved to a certain open position for causing the servo-motor to move the waste-gate toward closed position to effect whatever increase in turbine speed is required to maintain the selected pressure with that throttle opening until maximum speed is reached, and means under the control of the regulator for obtaining a rapid acceleration of the turbine in response to movement by the regulator of the throttle valve to a certain position of greater opening in consequence of the abrupt change in pressure selection to a relatively high pressure.

6. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, a regulator responsive to intake pressure for positioning the throttle valve in order to maintain a selected intake pressure with changing altitude, manually operable means for selecting the pressure to be maintained by the regulator, speed responsive means normally effective to control the servo-motor for positioning the waste-gate for minimum governed speed of the supercharger, means rendered effective upon movement of the throttle valve by the regulator to a certain open position for overriding the minimum speed control means and for causing the servo-motor to close the waste-gate as altitude increases in order to increase turbine speed and supercharger pressure, and speed responsive means which overrides control of the servo-motor by the regulator when a certain maximum speed is attained and which so controls the servo-motor as to position the waste gate for maximum turbine speed.

7. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, speed responsive means normally operative for controlling the servo-motor to obtain a governed minimum turbine speed, speed responsive means for controlling the servo-motor to obtain a governed maximum turbine speed, a throttle valve regulator responsive to intake pressure for effecting a movement of the throttle valve sufficient to maintain a selected pressure with changing altitude, manually operable means for partially opening the throttle valve and for selecting an intake pressure to be maintained by the regulator, means brought under the control of the regulator when the throttle valve has been moved to a certain open position for causing the servo-motor to move the waste-gate toward closed position to effect whatever increase in turbine speed is required to maintain the selected pressure with that throttle opening until maximum speed is reached, means under the control of the regulator for obtaining a rapid acceleration of the turbine in response to movement by the regulator of the throttle valve to a certain position of greater opening in consequence of the abrupt change in pressure selection to a relatively high pressure, and means for limiting the operation of the servo-motor to close the waste-gate when the exhaust back pressure exceeds a certain amount.

8. A system of control for an airplane engine having a supercharger driven by an engine exhaust turbine and a valve controlling the pressure of fuel mixture admitted to the engine and an exhaust waste-gate valve controlling the speed of the turbine and supercharger comprising, in combination, a servo-motor for moving the waste-gate, a regulator responsive to intake pressure for positioning the throttle valve in order to maintain a selected intake pressure with changing altitude, manually operable means for selecting the pressure to be maintained by the regulator, speed responsive means normally effective to control the servo-motor for positioning the waste-gate for minimum governed speed of the supercharger, means rendered effective upon movement of the throttle valve by the regulator to a certain open position for overriding the minimum speed control means and for causing the servo-motor to close the waste-gate as altitude increases in order to increase turbine speed and supercharger pressure, means under the control of the regulator for obtaining a rapid acceleration of the turbine in response to movement by the regulator of the throttle valve to a certain position of greater opening in consequence of the abrupt change in pressure selection to a relatively high pressure, speed responsive means which overrides control of the servo-motor by the regulator when a certain maximum speed is attained and which so controls the servo-motor as to position the waste gate for maximum turbine speed, and exhaust back pressure responsive means which overrides control of the servo-motor by the regulator when a maximum allowable exhaust back pressure is reached and causes the servo-motor to limit the closing of the waste-gate.

9. A system of control for a supercharged internal combustion engine comprising an intake duct having a throttle valve for controlling the flow of air or fuel-mixture to the engine, a throttle valve regulator which is manually conditioned for the selection of an intake pressure to be maintained and which is responsive to engine intake pressure so that the valve is positioned to correct for divergencies from the selected pressure, an exhaust turbine-driven-supercharger connected with the engine intake, a turbine-waste gate for controlling the speed of the supercharger, a reversible electric motor for moving the waste gate and having a first circuit for effecting closing of the waste gate to increase supercharger speed and a second circuit for effecting opening of the waste gate to decrease supercharger speed, a first-circuit control switch which is normally closed and which opens at a certain minimum supercharger speed, a second-circuit control switch which is normally open and which closes when the minimum speed is exceeded, a first-circuit control switch which is normally open and which closes at a certain open position of the throttle valve, a second-circuit control switch which is normally closed and which opens at a lesser open position of the throttle valve, a first circuit control switch which is normally closed and which opens when the supercharger speed exceeds a certain maximum and a second-circuit control switch which is normally open and which closes when the maximum speed is reached.

10. A system of control for a supercharged internal combustion engine comprising an intake duct having a throttle valve for controlling the flow of air or fuel-mixture to the engine, a throttle valve regulator which is manually conditioned for the selection of an intake pressure to be maintained and which is responsive to engine intake pressure so that the valve is positioned to correct for divergencies from the selected pressure, an exhaust turbine-driven-supercharger connected with the engine intake, a turbine waste gate for controlling the speed of the supercharger, a reversible electric motor for moving the waste gate and having a first circuit for effecting closing of the waste gate to increase supercharger speed and a second circuit for effecting opening of the waste gate to decrease supercharger speed, a first-circuit control switch which is normally closed and which opens at a certain minimum supercharger speed, a second-circuit control switch which is normally open and which closes when the minimum speed is exceeded, a first-circuit control switch which is normally open and which closes at a certain open position of the throttle valve, a second-circuit control switch which is normally closed and which opens at a lesser open position of the throttle valve, a first circuit control switch which is normally closed and which opens when the supercharger speed exceeds a certain maximum, a second-circuit control switch which is normally open and which closes when the maximum speed is reached, a first-circuit control switch normally closed and opening in response to attainment of a certain exhaust pressure, and a second-circuit control switch normally open and closed in response to exceeding said certain exhaust pressure.

11. A system of control for a supercharged internal combustion engine comprising an intake duct having a throttle valve for controlling the flow of air or fuel-mixture to the engine, a throttle valve regulator which is manually conditioned for the selection of an intake pressure to be maintained and which is responsive to engine intake pressure so that the valve is positioned to correct for divergencies from the selected pressure, an exhaust turbine-driven-supercharger connected with the engine intake, a turbine-waste gate for controlling the speed of the supercharger, a reversible electric motor for moving the waste gate and having a first circuit for effecting closing of the waste gate to increase supercharger speed and a second circuit for effecting opening of the waste gate to decrease supercharger speed, a first-circuit control switch which is normally closed and which opens at a certain minimum supercharger speed, a second-circuit control switch which is normally open and which closes when the minimum speed is exceeded, a first-circuit control switch which is normally open and which closes at a certain open position of the throttle valve, a second-circuit control switch which is normally closed and which opens at a lesser open position of the throttle valve, a first circuit control switch which is normally closed and which opens when the supercharger speed exceeds a certain maximum, a second-circuit control switch which is normally open and which closes when the maximum speed is reached, an electrically operated device for closing the waste-gate, and a normally open switch closed in response to a wide opening of the throttle valve for rendering the device operative.

12. A system of control for a supercharged internal combustion engine comprising an intake duct having a throttle valve for controlling the flow of air or fuel-mixture to the engine, a throttle valve regulator which is manually conditioned for the selection of an intake pressure to be maintained and which is responsive to engine intake pressure so that the valve is positioned to correct for divergencies from the selected pressure, an exhaust turbine-driven-supercharger connected with the engine intake, a turbine-waste gate for controlling the speed of the supercharger, a reversible electric motor for moving the waste gate and having a first circuit for effecting closing of the waste gate to increase supercharger speed and a second circuit for effecting opening of the waste gate to decrease supercharger speed, a first relay for controlling the first circuit of the motor, a second relay for controlling the second circuit of the motor, a current source; a series circuit comprising the source, the first relay and a normally closed switch opening in response to attainment of minimum supercharger speed; a series circuit comprising the source, the second relay, a normally closed switch opening in response to opening of the throttle valve to a certain extent, a normally closed switch opening in response to attainment of a certain maximum supercharger speed, and a normally open switch closed in response to exceeding a certain minimum supercharger speed; a circuit paralleling the normally closed throttle responsive switch and the normally closed maximum speed responsive switch and including a normally open switch closed in response to the attainment of said maximum supercharger speed; and a circuit paralleling the second relay and normally closed throttle responsive switch and including the first relay and a normally open switch which is closed in response to opening of the throttle to an extent greater than first mentioned.

13. A system of control for a supercharged internal combustion engine comprising an intake duct having a throttle valve for controlling the flow of air or fuel-mixture to the engine, a throttle valve regulator which is manually conditioned for the selection of an intake pressure to be maintained and which is responsive to engine intake pressure so that the valve is positioned to correct for divergencies from the selected pressure, an exhaust turbine-driven-supercharger connected with the engine intake, a turbine-waste gate for controlling the speed of the supercharger, a reversible electric motor for moving the waste gate and having a first circuit for effecting closing of the waste gate to increase supercharger speed and a second circuit for effecting opening of the waste gate to decrease supercharger speed, a first relay for controlling the first circuit of the motor, a second relay for controlling the second circuit of the motor, a current source; a series circuit comprising the source, the first relay and a normally closed switch opening in response to attainment of minimum supercharger speed; a series circuit comprising the source, the second relay, a normally closed switch opening in response to the opening of the throttle valve to a certain extent, a normally closed switch opening in response to the attainment of a certain exhaust pressure, a normally closed switch opening in response to the attainment of a certain maximum supercharger speed and a normally open switch closed in response to exceeding a certain minimum supercharger speed; a circuit paralleling the normally closed throttle responsive switch and the normally closed exhaust pressure responsive switch and the normally closed maximum speed responsive switch and including a normally open switch closed in response to the attainment of said maximum supercharger speed; a circuit paralleling the normally closed throttle responsive switch and said normally closed exhaust-pressure responsive switch and including a normally open switch closed in response to exceeding said predetermined exhaust pressure; a circuit paralleling the second relay and normally closed throttle responsive switch and including the first relay and a normally open switch which is closed in response to opening of the throttle to an extent greater than first mentioned and a circuit controlled by the last mentioned throttle controlled switch and paralleling the first relay and including an electrically operated device for closing the wastegate independently of the motor and a normally open switch closed in response to full opening of the throttle valve.

14. A system of control for a supercharged internal combustion engine comprising an intake duct having a throttle valve for controlling the flow of air or fuel-mixture to the engine, a throttle valve regulator which is manually conditioned for the selection of an intake pressure to be maintained and which is responsive to engine intake pressure so that the valve is positioned to correct for divergencies from the selected pressure, an exhaust turbine-driven-supercharger connected with the engine intake, a turbine-waste gate for controlling the speed of the supercharger, a reversible electric motor for moving the waste gate and having a first circuit for effecting closing of the waste gate to increase supercharger speed and a second circuit for effecting opening of the waste gate to decrease supercharger speed, a first relay for controlling the first circuit of the motor, a second relay for controlling the second circuit of the motor, a current source; a series circuit comprising the source, the first relay and a normally closed switch opening in response to attainment of minimum supercharger speed; a series circuit comprising the source, the second relay, a normally closed switch opening in response to the opening of the throttle valve to a certain extent, a normally closed switch opening in response to the attainment of a certain exhaust pressure, a normally closed switch opening in response to the attainment of a certain maximum supercharger speed and a normally open switch closed in response to exceeding a certain minimum supercharger speed; a circuit paralleling the normally closed throttle responsive switch and the normally closed exhaust pressure responsive switch and the normally closed maximum speed responsive switch and including a normally open switch closed in response to the attainment of said maximum supercharger speed; a circuit paralleling the normally closed throttle responsive switch and said normally closed exhaust-pressure responsive switch and including a normally open switch closed in response to exceeding said predetermined exhaust pressure; and a circuit paralleling the second relay and normally closed throttle responsive switch and including the first relay and a normally open switch which is closed in response to opening of the throttle to an extent greater than first mentioned.

PAUL L. SCHNEIDER.

REFERENCES CITED

The following references are of record in the file of this patent:

UNITED STATES PATENTS

| Number | Name | Date |
| --- | --- | --- |
| 2,292,288 | Pateras Pescara | Aug. 4, 1942 |